(12) United States Patent
Glass

(10) Patent No.: US 6,415,315 B1
(45) Date of Patent: Jul. 2, 2002

(54) METHOD OF MOVING OBJECTS IN A COMPUTER NETWORK

(75) Inventor: Graham W. Glass, Dallas, TX (US)

(73) Assignee: Recursion Software, Inc., Frisco, TX (US)

( * ) Notice: Subject to any disclaimer, the term of this patent is extended or adjusted under 35 U.S.C. 154(b) by 0 days.

(21) Appl. No.: 09/199,663

(22) Filed: Nov. 25, 1998

Related U.S. Application Data

(60) Provisional application No. 60/067,241, filed on Dec. 1, 1997.

(51) Int. Cl.$^7$ ................................................ G06F 15/16
(52) U.S. Cl. ........................................ 709/201; 709/202
(58) Field of Search .............................. 709/226, 238, 709/315, 203, 330, 201, 202

(56) References Cited

U.S. PATENT DOCUMENTS

| | | | | |
|---|---|---|---|---|
| 5,341,478 A | | 8/1994 | Travis et al. ................. | 395/200 |
| 5,603,031 A | | 2/1997 | White et al. .................. | 395/683 |
| 5,812,781 A | * | 9/1998 | Fahlman ...................... | 709/226 |
| 5,862,325 A | * | 1/1999 | Reed et al. ................... | 709/201 |
| 6,016,393 A | * | 1/2000 | White .......................... | 709/315 |
| 6,032,190 A | * | 2/2000 | Bremer ........................ | 709/238 |
| 6,041,166 A | * | 3/2000 | Hart ............................ | 709/238 |
| 6,253,256 B1 | * | 6/2001 | Wollrath et al. ............ | 709/330 |

* cited by examiner

*Primary Examiner*—Ario Etienne
*Assistant Examiner*—Kenneth W. Fields
(74) *Attorney, Agent, or Firm*—Baker Botts L.L.P.

(57) ABSTRACT

In a computer network (100), an object (102) located at a current host address and port number (104) receives a move indication (106) from itself or a virtual object (108) located at an originating host address and port number (110). After determining its availability to move, the object (102) creates a serialized version (112) of itself to send to a new host address and port number (114). The object (102) also retains an old version (116) of itself at the current host address and port number (104). A new version (118) of the object (102) is established at the new host address and port number (114) from the serialized version (112) of the object (102). Once established, the new version (118) sends a status update message (120) to the old version (116). The old version (116) de-registers itself from the current host address and port number (104). If forwarding is desired, the old version (116) creates a secretary object (122) that routes messages to the new version (118) that were addressed to the old version before updating has occurred in the computer network (100).

8 Claims, 8 Drawing Sheets

METHOD OF MOVING OBJECTS IN A COMPUTER NETWORK

CROSS REFERENCE TO RELATED APPLICATIONS

This application claims the benefit of U.S. Provisional Application No. 60/067,241 filed on Dec. 1, 1997.

TECHNICAL FIELD OF THE INVENTION

The present invention relates in general to object-oriented programming and architectures and more particularly to a method of moving objects in a computer network.

BACKGROUND OF THE INVENTION

In object-oriented programming, real world objects are modeled by software objects that have encapsulated therein special procedures and data elements. In object-oriented programming jargon, procedures are referred to as methods. To avoid having to redefine the same methods and data members for each and every occurrence of an object, object-oriented programming provides the concept of classes. An inheritance structure of one or more levels of increasingly more specialized classes is created to provide templates that define the methods and variables to be included in the objects of each class. Therefore, an object belonging to a class is a member of that class, and contains the special behavior defined by the class. In this manner, each object is an instance of a defined class or template and the need to redefine the methods and data members for each occurrence of the object is eliminated.

With the rise of distributed systems, client/server computing, and internet/intranet interactions, inter-node communications between applications have become a prerequisite. Early operating systems lacked support for inter-application communications, forcing software developers to write custom code to perform remote procedure call (RPC) for each and every application that needed remote communications.

Microsoft™ has developed DCOM™ (Distributed COM) to support inter-application communications across networked computer systems. Another technology standard for inter-object communications is CORBA™ (Common Object Request Broker Architecture) established by the Object Management Group (OMG) sponsored by more than 660 companies, including Digital Equipment Corporation™, Hewlett Packard™, IBM™, and. Sun Microsystems, Inc™. CORBA defines how messages from one object to another are to be formatted and how to guarantee delivery. The messaging in CORBA is performed by object request brokers (ORBs). ORBs receive messages to determine the location of the receiving object, route the message, and perform all necessary platform and language translations. In object technology, a message is typically a request sent to an object to change its state or return a value. The object has encapsulated methods to implement the response to the received messages. Through technologies such as DCOM™ and CORBAT™, objects can communicate with remote objects residing in other computer platforms connected by a network. However, a serious drawback of these objects under the conventional ORB technology is that they do not support the concept of mobility and therefore cannot move around the network to other computer platforms.

Enter the concept of agents. Agents are defined as specialized objects that possess the characteristic of autonomy. Autonomy is the ability to program an agent with one or more goals that it will attempt to satisfy, even when it has moved into a network onto other platforms and has lost all contact with its creator. General Magic, Inc.™ of Sunnyvale, Calif. has developed a set of interpreted object-oriented computer instructions called Telescript™. By using Telescript™ computer instructions, an agent may move from one place to another place by specifying the destination address, name, and/or class. However in Telescript™, agents cannot communicate remotely across the network. In other words, Telescript agents must occupy the same place in order for them to interact. Further, in order for two agents to interact, they must travel to a pre-established place known to both agents. This presents some very serious restrictions to the ability for agents to communicate with one another.

Another agent technology called Aglets™ has been introduced by IBM™. A significant difference between Aglets™ and Telescript™ is that Aglets is based on Java™, Sun Microsystems Inc.'s computer programming language. Although Aglets™ allows agent movement across the network, the destination must be a pre-established place known to the agent as in Telescript™. Further, Aglets™ agents also may not communicate remotely across the network with regular Java method invocation syntax. Again, these serious restrictions make Aglets™ very inflexible in inter-agent communications.

SUMMARY OF THE INVENTION

From the foregoing, it may be appreciated that a need has arisen for an autonomous and mobile agent architecture in an object-oriented programming environment. In accordance with the present invention, a method of moving objects in a computer network is provided that substantially eliminates or reduces disadvantages and problems associated with conventional mobile agent technology.

According to an embodiment of the present invention, there is provided a method of moving objects in a computer network that includes receiving a move indication at an object to move to a new host address and port number within the computer network from a current host address and port number within the computer network. Upon receiving the move indication, the object determines its availability to move. If available to move, a serialized version of the object is created and an old version of the object is retained at the current host address and port number. The serialized version of the object is sent to the new host address and port number and a new version of the object is created at the new host address and port number from the serialized version of the object. Upon establishment of the new version of the object at the new host address and port number, the old version of the object is de-registered from the current host address and port number. If forwarding is desired, the old version of the object creates a secretary object that takes care of forwarding messages to the new version of the object at the new host address and port number that were sent to the old version of the object at the current host address and port number.

The present invention provides various technical advantages over conventional mobile agent technology. For example, one technical advantage is to provide movement of objects in a computer network. Another technical advantage is to create a secretary object to handle message forwarding to the moved object. Yet another technical advantage is to retain an old version of the object at its current host address and port number during establishment of a new version of the object at the new host address and port number. Other technical advantages are readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
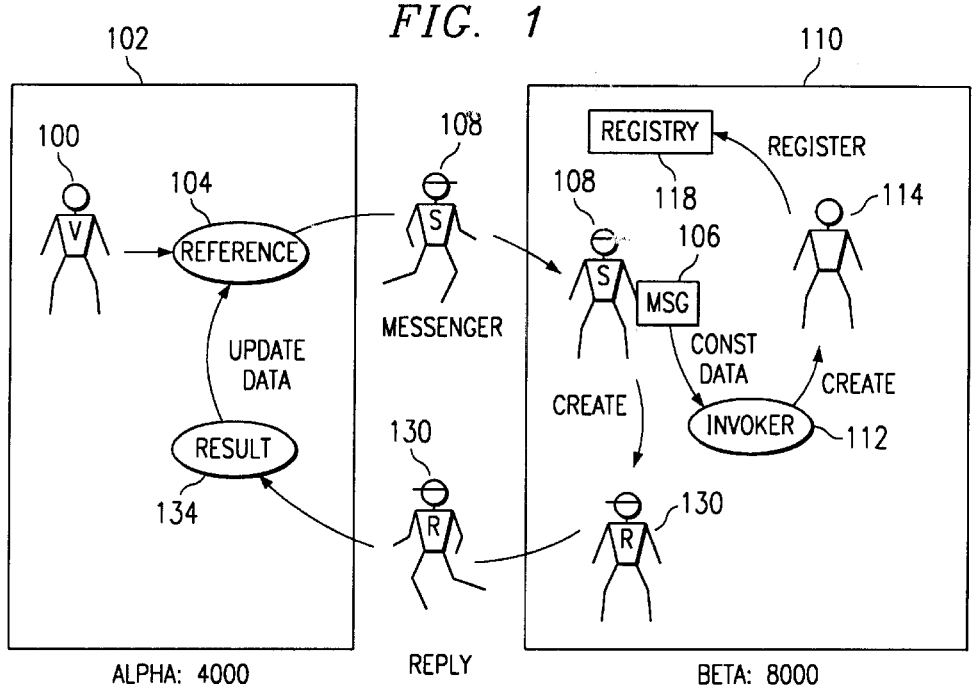
FIG. 1 is a diagram illustrating an exemplary process of constructing an agent remotely according to the teachings of the present invention.
Figure 2:
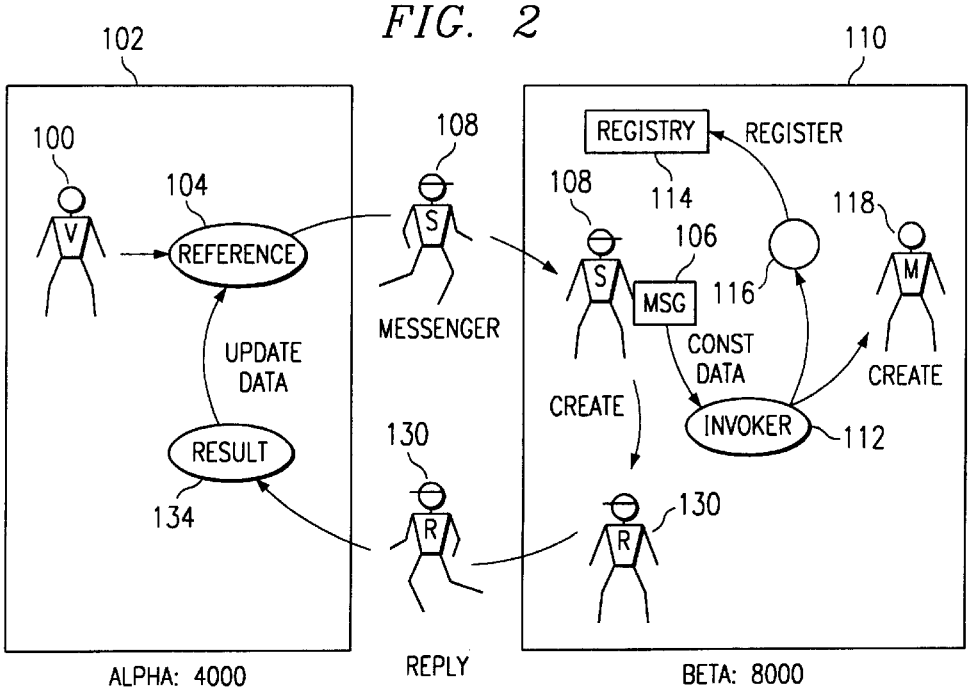
FIG. 2 is a diagram illustrating an exemplary process of constructing an object and its middleman remotely according to the teachings of the present invention.

The preferred embodiments of the present invention are illustrated in FIGS. 1–11, like reference numerals being used to refer to like and corresponding parts of the various drawings.

Remote Object Construction

According to the teachings of the present invention, an existing Java class may be enabled for use by remote clients without the need to modify it or recompile it. A virtual representation of that class is first created by running a utility vcc that reads either the compiled Java class or Java source code and generates a virtual class. The virtual class has all of the public methods of the original Java class in addition to methods for interfacing with a remote object instance of the original class and methods supporting mobility. Each constructor in the original class has a counterpart in the virtual class that has the same arguments plus an additional string that specifies the address the remote object. To distinguish the virtual class and the original class, a "V" prefix is added to the class name in the naming convention of the present invention. For example, if the original source code for the class Store is in the file Store.Java then the compiled class would be called Store.class, following conventional Java naming conventions. When vcc utility is run on Store.class, the new class VStore.class is created. When vcc is executed with the name of a class, it searches through the directories and zip files in the CLASSPATH environment variable to find the first .class and/or .java file that correspond to the specified file. If the .java file is the only file that was located, or if it was modified more recently than the .class file, vcc parses the .java file to create the virtual class, otherwise it parses the .class file to create the virtual class. Thereafter, to construct a remote object or agent of the class Store, the following exemplary syntax may be used:

Vstore vstore=new Vstore("dallas:8000/Store1");

By default, the name of the created object is set to a globally unique collection of bytes, but an optional string alias may be assigned. A conventional URL (uniform resource locator) syntax may also be used to refer to the object. For example, the new remote object with alias "Store1" is located at a remote host or IP address of "dallas" at port number "8000" with the above construction syntax. Note that the construction syntax follows conventional Java construction syntax with an enhanced or extended interface that accepts the string address and optional alias. Using this remote construction method, objects or agents may be constructed at a remote host address and port number, where an agent is a specialized object that can move itself and request encounters with other agents or objects. The concepts of movement and encounters are described in detail below.

Referring to FIG. 1, the mechanism of the remote construction of an agent is shown. The construction of a remote object or agent of a Java class having a virtual object or agent 100 is requested. Virtual object/agent 100 is an instance of the virtual class of the original Java class. The Java class, its virtual class, and virtual object/agent 100 reside in a first host address and port number 102 (ALPHA:4000). A reference 104 is constructed that refers to the host address and port number (BETA:8000) and alias (Store1) of the new remote agent to be constructed. An initializing message 106 is sent to the remote location or through reference 104 by a light weight messenger 108, which is a specialized agent. Initializing message 106 contains the remote host address and port number of the new remote agent and other information needed for constructing the new agent. Messenger 108 delivers initializing message 106 to the remote host address and port number 110. An invoker 112 for the original class from which the new remote agent is constructed is located by messenger 108 at host address and port number 110. If the original class does not exist in the classpath of host address and port number 110, it is created by remote loading all code related to the agent's class closure to host address and port number 110. A class closure is the set of all classes referenced by the agent's class. This code loading or copying may be done automatically over the network. Messenger 108 meets with an invoker 112 and provides it the necessary constructor arguments and constructor signature to construct the new remote object/agent. Invoker 112 then creates a new remote agent 114 from the information received from messenger 108 in host address and port number 110. Upon successful construction the alias of the new agent 114 is sent to host address and port number 110 in a second message from virtual agent 100. New agent 114 is then registered with a registry 118 of host address and port number 110, which now contains the agent's alias (Store1).

Thereafter, a light weight reply 130 to carry back a result to host address and port number 102 is created by messenger 108. Reply 120 contains the full address and heartbeat of new agent 114. The concept of the heartbeat is also related to the concept of the lifespan and described in detail below. Reply 130 travels back to host address and port number 102 and delivers result 134 and any exception that may have occurred and they get rethrown on host address and port number 102. Result 134 updates reference 104 with the full address and heartbeat of new remote agent 114.

As noted above, an agent is a special object with additional abilities of movement, persistence and event generation. When the remotely constructed object is not an agent, a special agent called a middleman is created. Referring to the diagram in FIG. 2, the process flow and reference numerals parallel that of FIG. 1, but what is created by invoker 112 in host address and port number 110 are a new remote object 116 and its middleman 118. Middleman 118 enables object 116 to act like an agent and further enable object 116 to be moved to another host address and port number. Therefore by using a middleman, any Java object is able to acquire the properties of agents such as movement without modifying the existing code therefor. In remote object construction, a result 134 is similarly generated and delivered back to host address and port number 102 as in remote agent construction shown in FIG. 1.

Messaging

The messaging mechanism used in remote object and agent construction is synchronous messaging, where the sender of the message waits for a reply to the message. Two other messaging mechanism are provided by the present invention, asynchronous messages and future messages. The sender of an asynchronous messages does not wait for a reply nor does it get a reply. The sender of a future message may check for a reply but does not wait for it.

Figure 3:
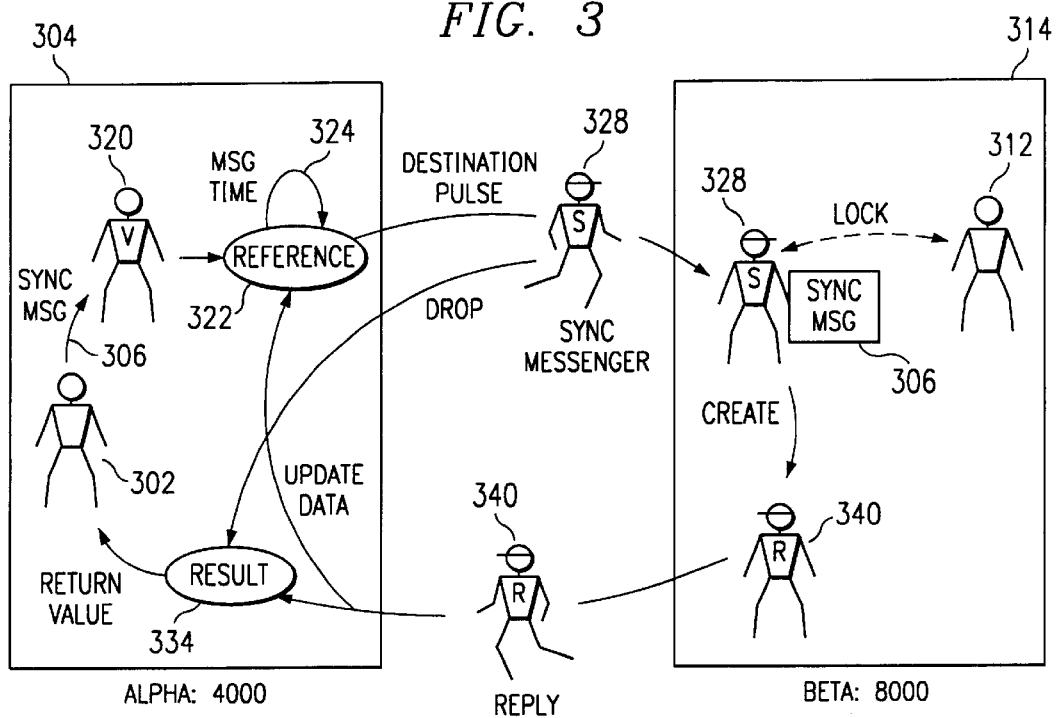
FIG. 3 is a diagram illustrating an exemplary process of sending a synchronous message according to the teachings of the present invention.

Referring to FIG. 3, the mechanism of synchronous messaging is shown in detail. An agent 302 at ALPHA:4000 304 desires to send a synchronous message 306 to another agent 312 at BETA:8000 314. Synchronous message 306 is sent via a virtual agent 320 of receiver agent 312. In this manner, normal Java syntax may be used for remote message communications. Recall that virtual agent 320 is an instance of a virtual class of the original class, where the virtual class contains the set of the original class' methods. Virtual agent 320 has a reference to a reference 322 to its remote counterpart, and synchronous message 306 is sent by reference 322, which maintains an address and lifespan information of receiver agent 312. Reference 322 determines the destination address and pulse of synchronous message 306, and further sets its internal message timer 324. The use of message timer 324 is related to the concept of lifespan and is used to send a heartbeat to agent 312 after a certain time has elapsed to keep agent 312 alive if messaging has not occurred. This feature is described in more detail below. A synchronous messenger 328 is created to carry synchronous message 306 to receiver agent 312. Synchronous messenger 328 drops a result 334 which will be used to contain or convey the return value back to sender agent 302. Sender agent 302 is blocked until a return value is received.

Synchronous messenger 328 carries the address of result 334 and travels through the network and tracks down receiver agent 312, who may have moved from the host address and port number specified by the destination address known to reference 322. Through the forwarder mechanism provided by the present invention and described in detail below, synchronous messenger 328 locates receiver agent 312 at BETA:8000 314. Messenger 328 requests an encounter with agent 312. Once granted, messenger 328 "pins" or locks agent 312 so it may not move away and the native Java reference to agent 512 cannot become stale. Messenger 328 tells agent 312 to invoice the message on itself using Java reflection, which in turn provides the necessary data to its invoker. A reply is generated as a result of the message delivery and synchronous messenger 328 creates a reply 340 to carry the return value or exception back to sender agent 302. Reply 340 is given the address of result 334. Having accomplished its task, synchronous messenger 328 dies or is otherwise garbage collected and agent 312 is free to move around again. Reply 340 carries the return value or exception back to ALPHA:4000, notifies result 334 of its arrival, and provides the return value or exception thereto. If the method involved threw an exception, the exception is rethrown on the calling thread.

If receiver agent 312 has modified certain parameters associated therewith, such as its location and heartbeat, reply 340 also carries this update information back to host address and port number 304. The update data is conveyed to reference 322 to update its reference to agent 312 accordingly. If agent 312 had moved, then the address reference of reference 322 therefor is updated to reflect agent 312's current location. The next time a message is destined for agent 312, no forwarding by its forwarder is therefore necessary. This mechanism is described in more detail below.

Figure 4:
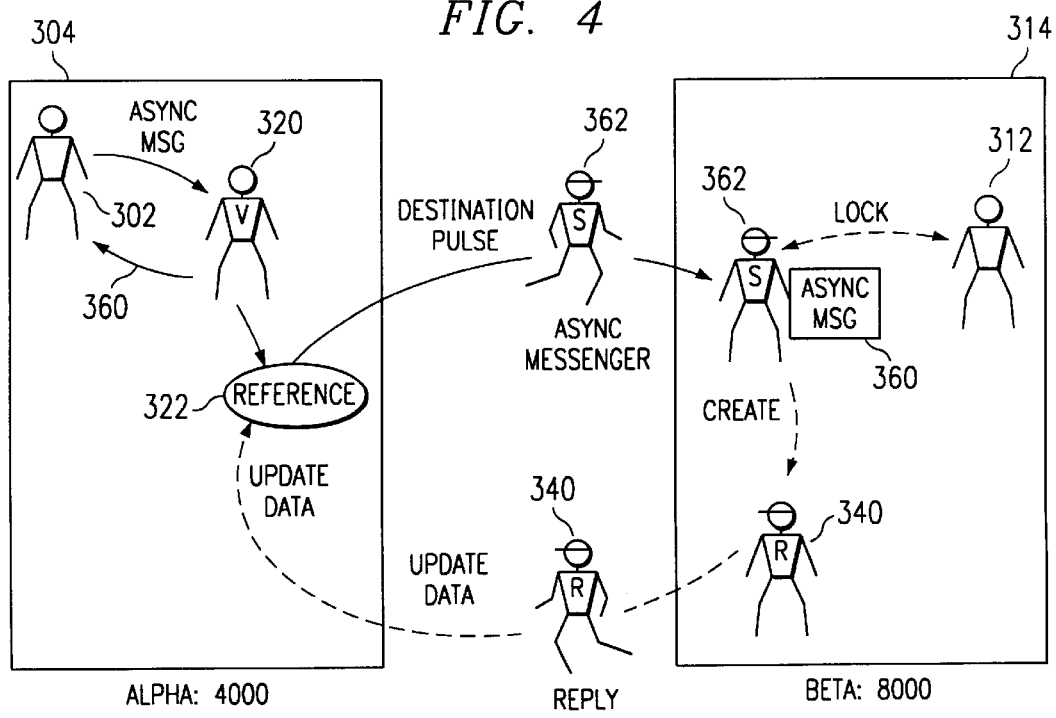
FIG. 4 is a diagram illustrating an exemplary process of sending an asynchronous message according to the teachings of the present invention.

Referring to FIG. 4, a diagram of an exemplary asynchronous messaging mechanism according to the teachings of the present invention is shown. Instead of sending a synchronous message as shown in FIG. 3, sender agent 302 now wishes to send receiver agent 312 an asynchronous message 360. Because no reply is expected, no blocking occurs, and sender agent 302 does not wait for a reply to its asynchronous message. Virtual agent 320 sends asynchronous message 360 through reference 322, which creates an asynchronous messenger 362 to deliver the message. Asynchronous messenger 362 tracks down receiver agent 312 in host address and port number 314 and requests to deliver the message to agent 312. Once granted, agent 312 is locked and cannot move away during the encounter. Agent 312 invokes the message on itself using Java reflection. Receiver agent 312 then receives asynchronous message 360. Typically, no reply is generated for an asynchronous message, however, if the location or heartbeat of receiver agent 312 has been modified and is different than that known to reference 322, then a reply 340 is created by asynchronous messenger 362. Reply 340 then provides the location update to reference 322 through which the message was sent and updates all references to agent 312.

Figure 5:
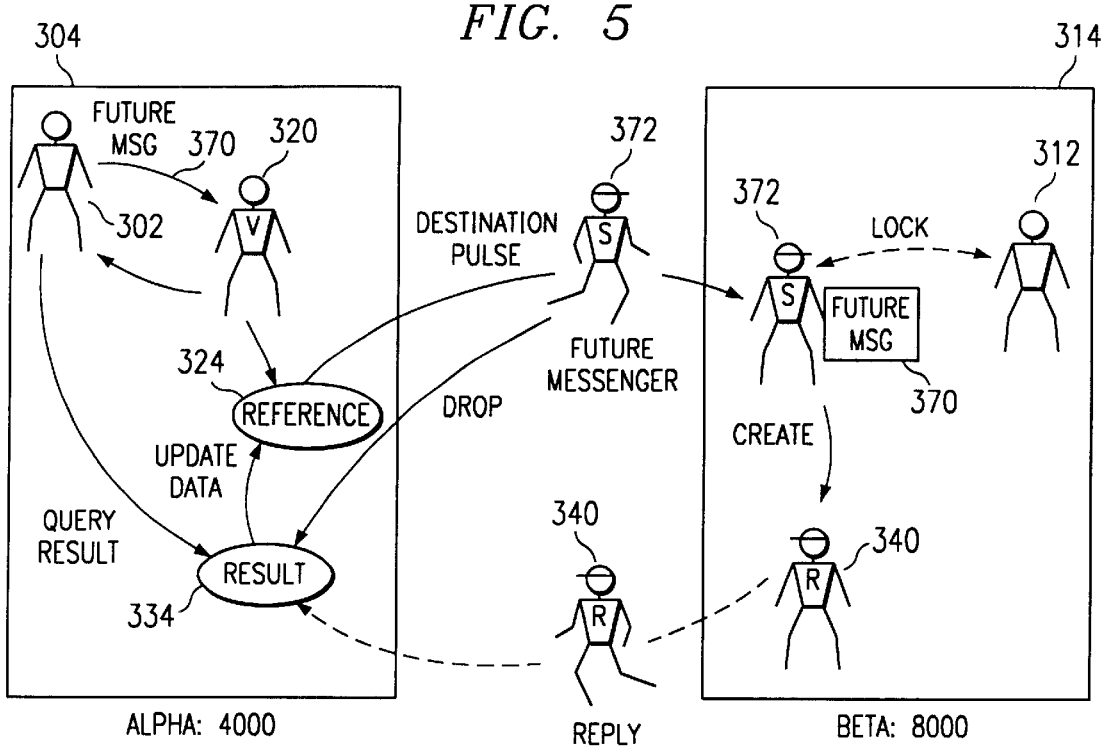
FIG. 5 is a diagram illustrating an exemplary process of sending a future message according to the teachings of the present invention.

FIG. 5 is a diagram of an exemplary future messaging mechanism according to the teachings of the present invention. Sender agent 302 at host address and port number 304 desires to send a future message 370 to receiver agent 312 at host address and port number 314. By definition, the sender of a future message is provided a reference to a location where the return value will be stored, and the sender may retrieve the return value any time. The process may be a blocking read, a non-blocking read, or an event-based notification. As shown in FIG. 5, sender agent 302 sends future message 370 via virtual agent 320 which uses handle 324 to create a future messenger 372 to deliver the message. Future messenger 372 drops a result 334 and remembers its address as in synchronous messaging, however, sender agent 302 is not blocked and returns immediately. Future messenger 372 travels to host address and port number 314, possibly through forwarding agents and requests to deliver the message to receiver agent 312. Method invocation by Java reflection is done by receiving agent 312. Future messenger 372 then creates a reply 340 to carry back the return value or exception and possibly update data such as new heartbeat or address of receiver agent 312. Reply 340 travels to host address and port number 304 and provides the return value and update data to result 334. The update data is then provided to reference 324, which uses it to update its address reference to agent 312. Sender agent 302, at some time, may query result 334 for the return value. If sender agent 302 queries for the reply prior to the return of reply 340, then sender agent 302 may be blocked until the reply is available. This may be a blocking read, non-blocking read or an event-based notification.

Figure 6:
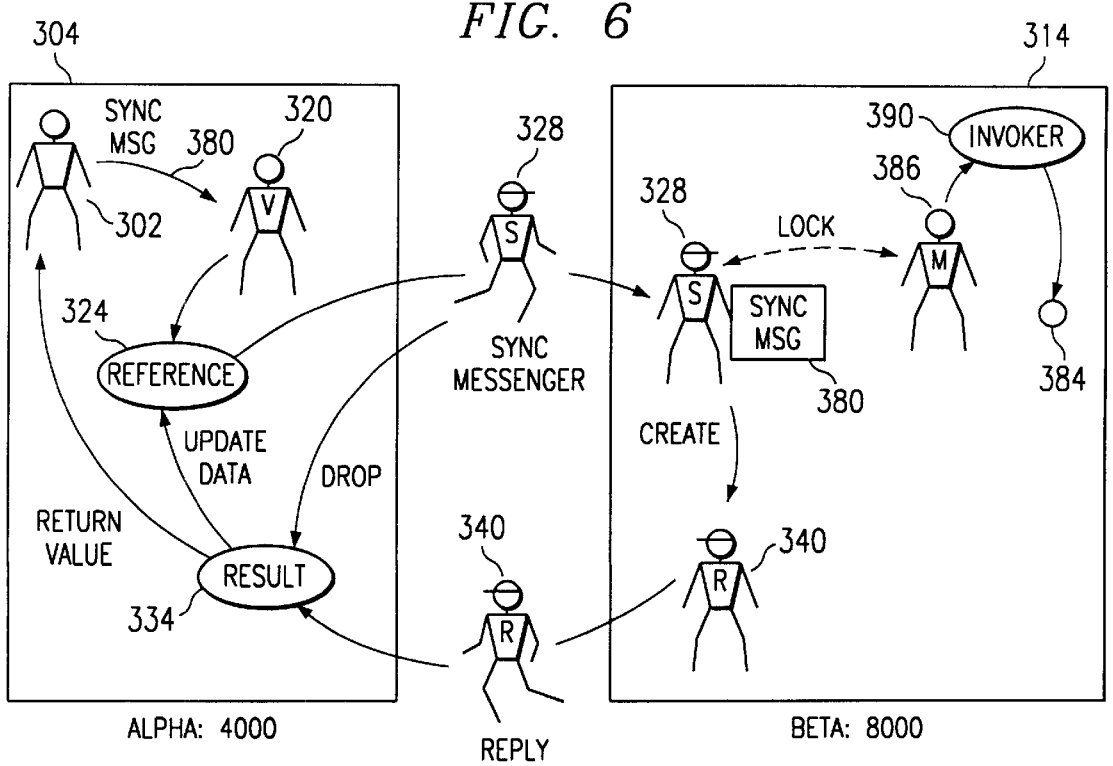
FIG. 6 is a diagram illustrating an exemplary process of sending a message to a remote object through a middleman.

If the intended receiver of the message is a remote object rather than an agent, then the middleman is used. Referring to FIG. 6, a diagram of an exemplary remote object messaging mechanism is shown. Sender agent 302 at ALPHA:4000 304 desires to send a message to a remote object 384 at BETA:8000 314. Although synchronous messaging is illustrated in FIG. 6, asynchronous and future messages may be also delivered to remote object 384 in the same manner. Virtual agent 320 uses reference 324 to send synchronous message 380. A synchronous messenger 328 drops result 334 and delivers the message to BETA:8000 314. Middleman 386 requests its own invoker 390 to invoke the method on receiver object 384. Thereafter using Java reflection, invoker 390 of middleman 386 sends message 380 to receiver object 384.

If receiver object 384 does not understand the delivered message, then message 380 is intended for middleman 386, and invoker 390 sends message 380 to middleman 386. An example of a message intended for the middleman and not understood by the object associated therewith is the moveto( ) message. The moveto( ) message is used to command the middleman of a remote object to move the object to another city. When the method invocation returns with a value, either from middleman 386 or object 384, it is delivered by a reply 340 created by synchronous messenger 328 back to sender agent 302 at ALPHA:4000.

Note that synchronous, asynchronous, future, and result messengers are specialized light weight agents that has the capability to navigate multi-protocol networks. Since they carry their own special abilities with them, there is no need to pre-install special facilities at each network node in order to accomplish features such as store-and-forward or fault-tolerant messaging.

Lifespan

As noted above, all remote objects and agents have a lifespan or a predetermined time period of existence. The lifespan of an object or agent may be defined based on the length of time the object/agent has been in existence, the length of time the object/agent has been inactive, and the relative or absolute time when the object/agent is to die. An object/agent may also live forever. By default, an agent lives for one day. The description of the lifespan mechanism below is applicable to an agent as well as an object via the use of the middleman as described above in messaging.

Figure 7:
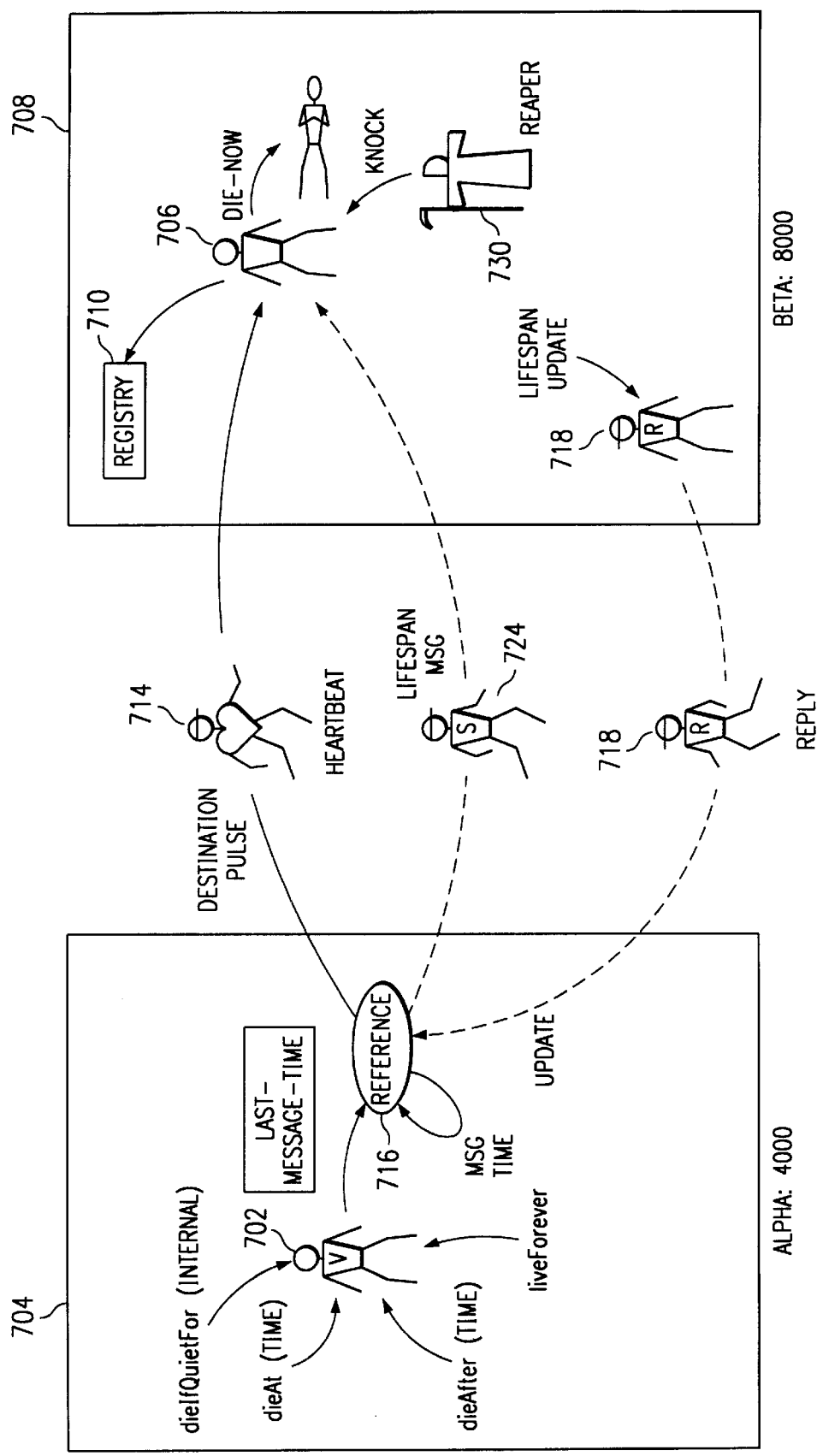
FIG. 7 is a diagram illustrating an exemplary process of setting the lifespan of an object or agent.

FIG. 7 illustrates the lifespan mechanism, where a virtual agent 702 at ALPHA:4000 704 is a virtual representation of a remote agent 706 residing at BETA:8000 708. When remote agent 706 is first constructed, it registers itself with BETA:8000's naming service or registry 710. Agent 706 contains a last-message-time variable initialized to the current time, and a time-to-die variable initialized to a predetermined interval, such as the number of milliseconds in a day. Virtual agent 702 also contains a last-message-time variable initialized to current time, and a pulse variable initialized to the same value as the remote agent's time-to-die value. When virtual agent 702 is used to send a message to remote agent 706, its last-message-time variable is reset to current time. Similarly, when remote agent 706 receives the message, its last-message-time variable is also reset to the current time. Virtual agent 702 periodically checks if the elapsed time since last-message-time variable is greater than its pulse value. If it is greater, then virtual agent 702 automatically sends a heartbeat message 714 to remote agent 706 through reference 716 via the asynchronous message mechanism (this is shown simplified in FIG. 7). Upon receipt of the heartbeat message, the last-message-time variable of remote agent 706 is reset to the current time. Heartbeat message 714 also contains the current pulse value of virtual agent 702. This pulse value is compared with the time-to-die variable of remote agent 706. If these values differ, the new time-to-die value is sent back as an explicit message 718 to virtual agent 702 to update its pulse value. Periodically, remote agent 706 checks if the elapsed time since last-message-time variable is greater than its time-to-die variable. If so, remote agent 706 sends itself a message die-now ( ), which causes remote agent 706 to deregister itself from registry 710 and allow itself to be garbage collected.

Remote agent's lifespan may be changed by sending it lifespan messages 724 via the synchronous messaging mechanism. Lifespan messages 724 include dieIfQuietFor (interval) dieAt(time), dieAfter(time), and liveForever( ). Assume that remote agent 706 is sent a dieIfQuietFor (interval) message or command and remote agent 706 does not have an encounter or receive a message (heartbeat or otherwise) for the specified time interval. When a reaper 730 then "knocks on the door of" remote agent 706, remote agent 706 checks the elapsed time since last-message-time variable and compares it to the time interval specified in the dieIfQuietFor( ) message. If the last-message-time variable is greater than the specified time interval, remote agent 706 dies. Reaper 730 is simply a mechanism that periodically reminds the agents to check their lifespan. Death is achieved by deregistering from also registry 710 and allowing itself to be garbage collected.

Remote agent's lifespan also may be modified by sending it the dieAt(time) message or command, which specifies an absolute time for death. When the dieAt(time) message returns to virtual agent 702, the handle's pulse variable is modified to prevent future heartbeat messages to be sent to remote agent 706. Thereafter, each time reaper 730 knocks, remote agent 706 compares the current time to the time specified by the dieAt( ) message. The agent dies if the current time indicates that the specified time has passed.

The lifespan of remote agent 706 may be further modified by sending it the dieAfter(time) message, which specifies a relative time for death. When the dieAfter(time) message is received by remote agent 706, the receipt time is noted. When the message returns to virtual agent 702, the handle's pulse variable is modified to prevent future heartbeat messages to be sent to remote agent 706. Thereafter when reaper 730 knocks, remote agent 706 compares the elapsed time since the receipt of the dieAfter( ) message with the time specified in the command. Remote agent 706 dies if the specified time is less than or equal to the elapsed time.

Remote agent 706 may also be told to liveForever. The agent ignores any knocks by the reaper and no heartbeat messages are sent to it.

A return result is generally generated by the lifespan messages, heartbeat messages, or any other message. If the messenger detected that the pulse value carried by the messenger is different from the time-to-die variable of remote agent 706, the new time-to-die value is returned to virtual agent 702 and used to update handle 716. A slop factor may be included to account for potential network delays in the delivery of heartbeat messages.

Movement

FIGS. 8A–8E depict the process of moving an object from one position to another within a computer network. Examples of types of movement include an object moving to another program, an object moving to another program with callback, an object moving to another object, and an object moving to another object with callback.

Figure 8A:
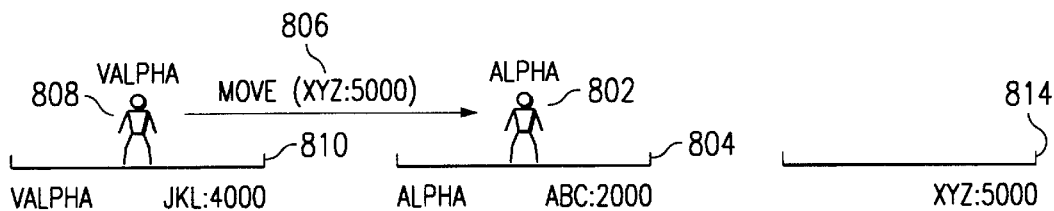
FIGS. 8A–8E are simplified diagrams illustrating an exemplary process of moving an object from one position to another within a computer network according to the teachings of the present invention.

The movement process begins in FIG. 8A where an object 802 located at a current host address and port number 804 receives a move indication 806. Move indication 806 may be received from a virtual object 808 located at an originating host address and port number 810. Virtual object 808 is a virtual representation of object 802. Object 802 may also be an agent that carries its own move indication 806.

Figure 8B:
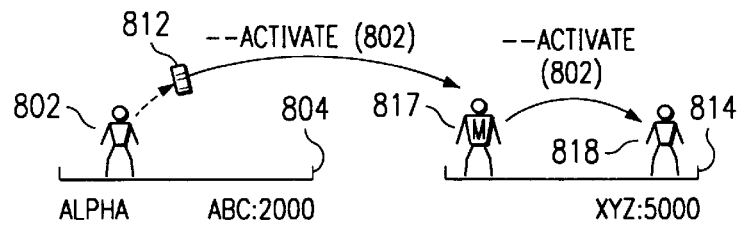

In response to move indication 806, the move operation continues in FIG. 8B where object 802 creates a serialized version 112 of itself at current host address and port number 804. The serialized version 812 is then sent to a desired new host address and port number 814. This serialization occurs by object 802 sending a message containing itself as a parameter.

Figure 8C:
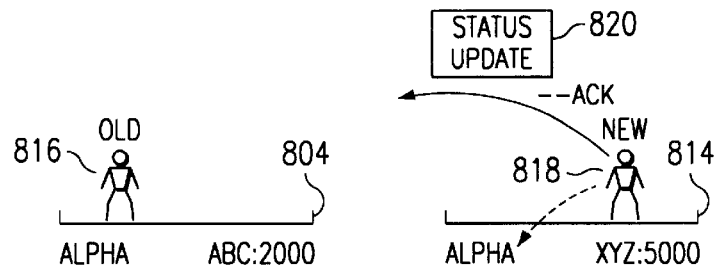

The move operation continues in FIG. 8C where object 802 also retains an old version 816 of itself at current host address and port number 804. A new version 818 of object 802 is created at new host address and port number 814 from the serialized version 812. The new version 818 of object 802 registers itself at new host address and port number 814. Upon creation of new version 818, a status update message 820 is sent to old version 816 at current host address and port number 804 from new version 818 now at new host address and port number 814.

Figure 8D:
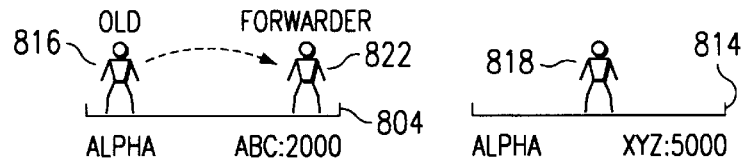

The move operation continues at FIG. 8D where the old version 816 receives the status update message 820 and determines whether forwarding is desired. If message forwarding is desired, old version 816 creates a forwarder object 822 and routes the status update message 820 to forwarder object 822. The status update message 820 contains the new host address and port number for new version 818 to allow forwarder object 822 to forward messages sent to object 802 at current host address and port number 804 from other objects not knowing that object 802 has moved to new host address and port number 814.

Figure 8E:
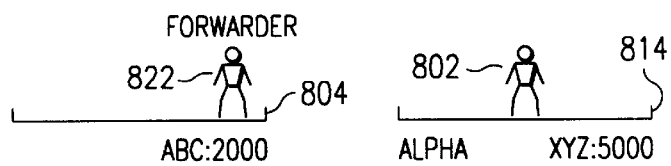

The move operation continues at FIG. 8E where old version 816 deregisters itself from current host address and port number 804. Messages that were blocked by initiation of move indication 106 now proceed to forwarder object 822 for routing to new version 818 at new host address and port number 814. Forwarder object 822 is given the lifespan of object 802. Forwarder object 822 will be allowed to die all forwarding operations have been performed and the computer network has been updated with the new location of object 802.

Movement may be an encounter between two agents. If A moves to B, then B can be an agent, a middleman for some object, or a middleman for an application program. This movement section is describing moving to a destination application program. Serialization of agent 802 occurs by sending a "--activate( )" call to the middleman 817 for the destination application program, wherein a reference to agent 802 is contained in the activate message.

Agent 802 locks itself and ends any encounter it was entered into. This lets all encounters (messages and agent encounters) end and queues subsequent encounters. These encounters will be forwarded by the agent itself if the move succeeds and if forwarding has been initiated. The middleman 817 for the destination application program then sends the --activate( ) call for the creation of a new version 818 that came in the activate call. At this point, the new version 818 checks to see if it has a callback and, if so, prepares the method for invocation.

A status acknowledgment update is sent to old version 816. This --ack( ) call is instructing old version 816 that the move succeeded. Upon receipt of the--ack( ) call old version 816 verifies that the original --activate( ) call did not timeout. If it timed out, then an exception is thrown. The--ack( ) call fails and new version 818 aborts the move and is garbage collected. If the original --activate( ) call did not timeout, then old version 816 gets the address of the new version 818 (contained in the --ack( ) call) and can then act as its own forwarder for any messages queued during the move.

Assuming the ack( ) call completes, new version 818 gets an encounter with the destination application program and locks itself. New version 818 registers itself at the destination application program at new host address and port number 814. At this point, the move cannot be aborted and new version 818 at new host address and port number 814 is in the destination application program. If at any time before this point, an exception occurs, then the original --activate( ) call fails and, thus, the move fails. If the - - -ack( ) call proceeds, the move can fail in the sense that old version 816 still exists, causing two versions to exist simultaneously. The registration process will remove any forwarders from the application program that may have been forwarding to old version 816. If old version 816 is persistent, it is saved to the object storage of the originating application program. Since old version 816 tracks its forwarders, it will track a reference to the forwarder that will be dropped in old version 816 if forwarding is on. Thus when it dies, it can instruct all of its forwarders to die.

After registering, new version 818 unlocks itself and gets a thread from the application program on which it can have its encounter. Now the original --activate( ) call returns, and the encounter begins on a separate thread.

Old version 816 now deregisters from the old application program when the --activate( ) call returns. Deregistration involves removing itself from the registry, removing itself from the object storage (if persistent), and dropping a forwarder if it is forwarding. The forwarder takes care of any new incoming messages or agents. Old version 816 unlocks itself which allows any encounters that have been queued upon the agent (while it was moving) to continue. These encounters are forwarded by old version 816 and old version 816 is garbage collected.

Back in the destination application program, the encounter is happening on a spawned thread. If the moving agent had no callback, the encounter ends. If the agent had a callback, the callback is invoked on the agent. If the agent moved to another object (as opposed to the destination application program), then a native Java reference to the object is passed in the callback. As long as the callback is executing, the destination object is pinned and the Java reference obtained is thus valid. When the callback ends, or the object is explicitly released, then the encounter ends.

Forwarding

FIGS. 9A–9D depict the operation of forwarder object 922. The forwarder operation begins at FIG. 9A where messages MSG1 from an object 924 at a first host address and port number 925 and message MSG2 from an object 926 at a second host address and port number 928 require processing. Messages MSG1 and MSG2 may be messages that were previously sent but were blocked as a result of move indication 806 or may be messages sent from out of date objects at host address and port numbers not knowing that object 902 has moved to a new host address and port number 914.

Figure 9A:
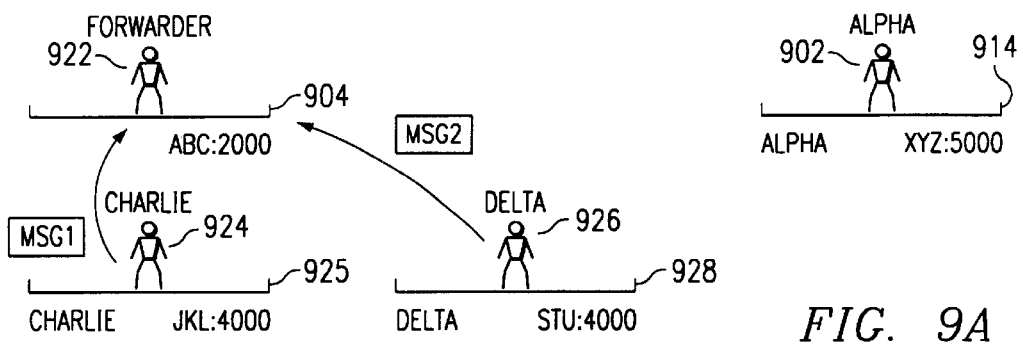
FIGS. 9A–9D are simplified diagrams illustrating an exemplary process of forwarding messages by a forwarder object according to the teachings of the present invention.
Figure 9B:
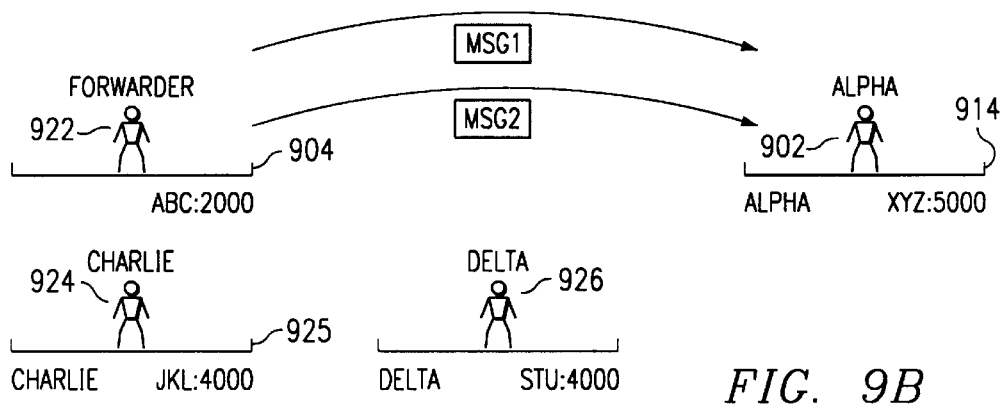

The forwarding continues at FIG. 9B where separate forwarder object 922, knowing the new host address and port number 914 for object 902, appropriately reroutes messages MSG1 and MSG2 to object 902. When the messengers for messages MSG1 and MSG2 (actually Smart Messengers) arrive at host address and port number 904, they look up the agent they are to be invoked on. This lookup process actually returns the forwarder 922 to the desired agent. When the messages request an encounter with this forwarder 922, the forwarder 922 throws a "moved exception" that the messengers of MSG1 and MSG2 catch and use to re-route themselves to the new destination (which could in turn be another forwarder).

Figure 9C:
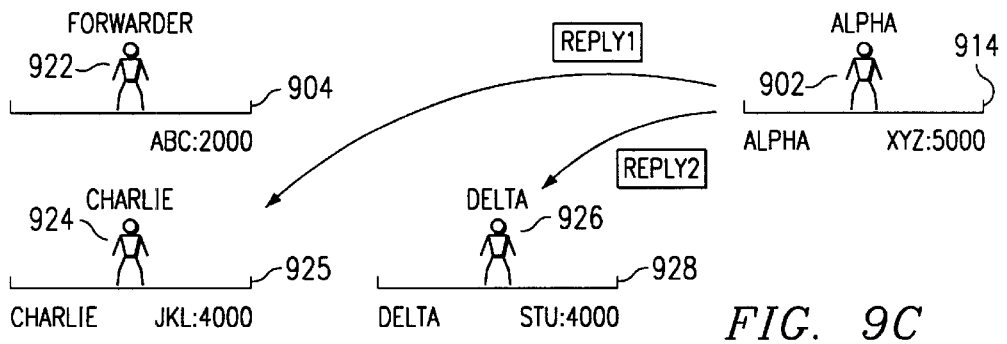

The forwarder operation continues at FIG. 9C, where object 902 has received messages MSG1 and MSG2. Object 902 generates a reply message REPLY1 that is sent directly to object 924 at first host address and port number 925 in response to message MSG1. The location of object 924 comes from the messenger for message MSG1 as it knows from where it originated. Object 902 generates a reply message REPLY2 that is sent to object 926 at second host address and port number 928 in response to MSG2.

Figure 9D:
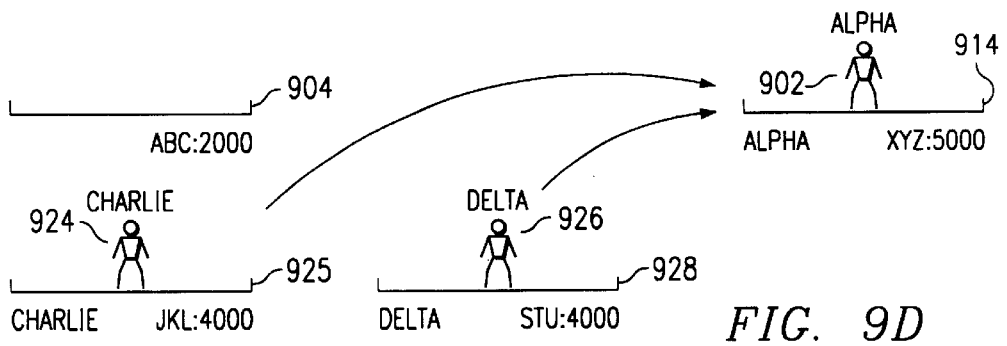

The forwarder operation continues at FIG. 9D where object 924 updates its reference to 902 in response to the reply message REPLY1 and object 926 updates it reference to object 902 in response to reply message REPLY2. With updated references to object 902, objects 924 and 926 can now send messages directly to object 902 without going through forwarder object 922. Forwarder object 922 will be allowed to die based on the lifespan received from old version 916 of object 902 with such death typically occurring as a result of inactivity due to completion of its forwarding function and references being updated to new host address and port number 914 for object 902. Forwarder object 922 also dies if its associated object 902 has been programmed to die at any given time.

Multi-Hop Movement

There may be instances where an object is directed to move from an originating host address and port number to a destination host address and port number, however security restrictions may not allow a direct movement from originating to destination host address and port numbers. In such a situation, one or more intermediate host address and port numbers may be used to complete the move operation. A compound addressing scheme is used that includes intermediate and destination host address and port numbers. For applets, any send is automatically redirected through its servicer router. Even if the address contains only the destination, the applet automatically sends any message to the router where the message wakes up and sees that it has more movement to make.

FIGS. 10A–D depict a multi-hop movement operation. A multi-hop movement operation begins at FIG. 10A where object 1002 receives a move indication 1006. In this instance, move indication 906 requires object 1002 to move to a destination host address and port number 1030 that does not have a direct connection to current host address and port number 1004 of object 002. Since object 1002 knows that it cannot move directly to destination host address and port number 1030, the address for move indication 1006 is built as a compound address to include one or more intermediate host address and port numbers and the destination host address and port number. For this example, a single intermediate host address and port number 1014 will be used.

Figure 10A:
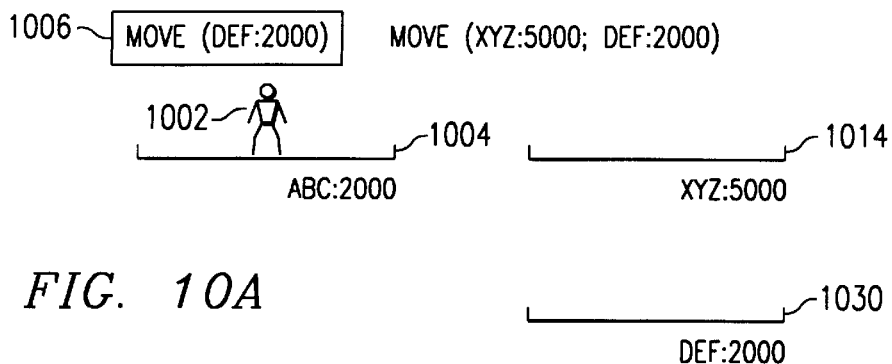
FIGS. 10A–10D are simplified diagrams illustrating an exemplary process of multi-hop movement according to the teachings of the present invention.
Figure 10B:
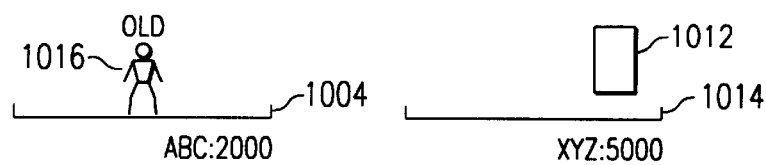

With the compound addressing, the multi-hop movement operation continues in FIG. 10B where object 1002 moves from current host address and port number 1004 to intermediate host address and port number 1014 as previously described. An old version 1016 of object 1002 is retained at current host address and port number 1004 and the serialized version of 1012 of object 1002 is sent to intermediate host address and port number 1014. Upon reaching intermediate host address and port number 1014, serialized version 1012 examines its destination address to see if it has reached its final destination. In this instance, serialized version 1012 has not reached its final destination and thus continues on by sending itself to destination host address and port number 1030 according to the compound address.

Figure 10C:

The multi-hop movement operation continues in FIG. 10C where serialized version 1012 reaches destination host address and port number 1030 and creates new version 1018 of object 1002.

Figure 10D:
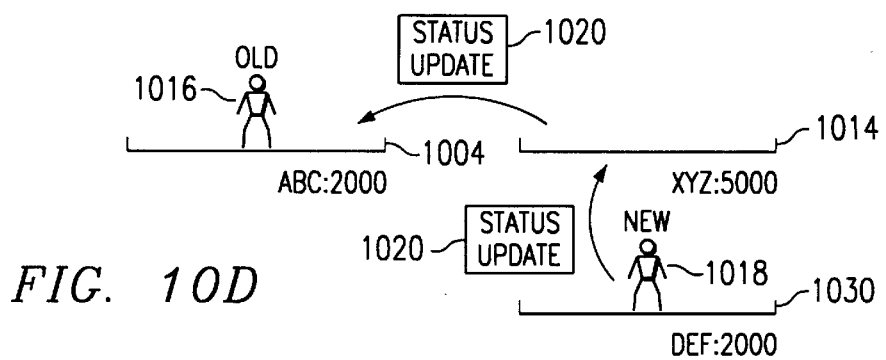

The multi-hop movement operation continues at FIG. 10D where the new version 1018 upon creation returns a status update message 1020 that includes a compound address of intermediate host address and port number 1014 and originating host address and port number 1004. Status update message 1020 follows its initial addressing criteria and enters intermediate host address at port number 1014. Status update message 1020 sees that it has not reached its final destination and continues on to originating host address and port number 1004 according to its destination criteria within the compound address.

Encounter

Although sending a message to a remote object is very convenient, it is also generally between ten thousand and one million times slower than sending a regular Java message to a local object. To avoid this network latency, an agent can move to the same host address and port number as the object it wishes to communicate with and obtain a local reference to the object. It can then use its local reference to send regular Java messages. This feature is called an encounter. When an encounter is requested, a first agent will move to the location of the second agent and hold the second agent at that location until the encounter is over. This prevents the second agent from moving away halfway through the encounter.

Figure 11A:
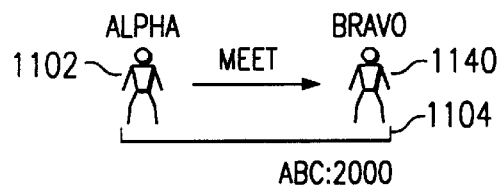
FIGS. 11A–11D are simplified diagrams illustrating an exemplary process of a meeting between two objects.

FIGS. 11A–D depict a encounter operation. In FIG. 11A, object 1102 requests to an encounter with object 1140. Object 1102 may have received an encounter request at a different host address and port number requiring it to move to the host address and port number where its encounter member, in this case object 1140, is located. Upon reaching the host address and port number 1104 where object 1140 is located, object 1102 requests an encounter with object 1140. Object 1140 determines whether it is available for an encounter. If object 1140 is not available for an encounter, object 1102 will continue to request an encounter until object 1140 becomes available. For example, object 1140 may not be available because it is in the middle of a move operation. In such a circumstance, object 1102 will follow object 1140 to its new host address and port number until object 1140 grants an encounter with object 1102.

Figure 11B:
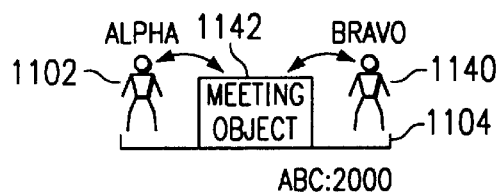

The encounter operation continues in FIG. 11B, where object 1140 has indicated that it is available for an encounter. Upon availability, object 1140 creates an encounter object 1142 that binds object 1102 with object 1140. Object 1102 adds a reference for the encounter object 1142 to its collection of current encounters. The collection of current encounters may include encounters which were initiated by other objects. Preferably, an object is only able to initiate one encounter at a time.

Figure 11C:
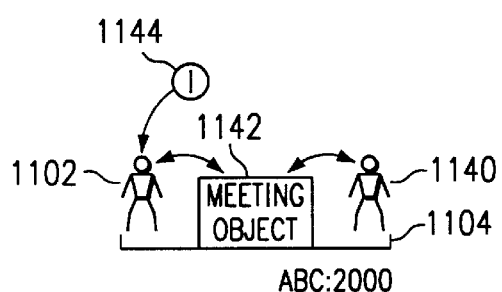

The encounter operation continues in FIG. 11C where object 1102 gets its method invoker 1144 to invoke the meet call back function on itself with object 1140 as an argument. In those cases where object 1140 is a middleman for another object, the argument in object 1102's meet call back function is in actuality the other object and not middleman 1140. Similarly, object 1102 may be a middleman for another object. In this circumstance, the encounter call back function is executed on the object for which object 1102 is a middle man. Invoker 1144 invokes the call back function on object 1102 in order to execute the encounter.

Figure 11D:
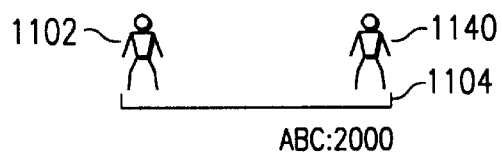

The encounter operation continues in FIG. 11D where object 1102 begins the process of ending the encounter upon finishing execution of the call back function. Object 1102 instructs object 1140 to end the encounter. Both object 1102 and object 1140 remove the encounter from their collection of encounters in order to end the encounter. encounter object 1142 is released for subsequent use.

Thus, it is apparent that there has been provided, in accordance with the present invention, a method of moving objects in a computer network that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of moving objects in a computer network, comprising:

receiving a move indication at an object to move to a new host address and port number of the computer network from a current host address and port number of the computer network;

determining whether the object is available for a move;

creating a serialized version of the object in response to the object's availability to move, the serialized version being a message that includes the object as a parameter;

retaining an old version of the object at the current host address and port number position;

sending the message representing the serialized version of the object to the new host address and port number;

creating a new version of the object at the new host address and port number from the serialized version of the object;

sending a status update message from the new version of the object to the old version of the object, the status update message including an indication that the new version of the object has been established at the new host address and port number;

determining whether forwarding is desired for the old version of the object;

creating a forwarder object from the old version of the object at the current host address and port number in response to forwarding being desired.

2. The method of claim 1, further comprising:

de-registering an identification of the old version of the object from the current host address and port number.

3. The method of claim 1, further comprising:

registering the forwarder object in place of the old version of the object.

4. A method of moving objects in a computer network, comprising:

receiving a move indication at an object to move to a new host address and port number of the computer network from a current host address and port number of the computer network;

determining whether the object is available for a move;

creating a serialized version of the object in response to the object's availability to move, the serialized version being a message that includes the object as a parameter;

retaining an old version of the object at the current host address and port number position;

sending the message representing the serialized version of the object to the new host address and port number;

creating a new version of the object at the new host address and port number from the serialized version of the object;

wherein the object is an agent that contains its own move indication.

5. A method of moving objects in a computer network, comprising:

receiving a move indication at an object to move to a new host address and port number of the computer network from a current host address and port number of the computer network;

determining whether the object is available for a move;

creating a serialized version of the object in response to the object's availability to move, the serialized version being a message that includes the object as a parameter;

retaining an old version of the object at the current host address and port number position;

sending the message representing the serialized version of the object to the new host address and port number;

creating a new version of the object at the new host address and port number from the serialized version of the object;

wherein the move indication is received from a virtual object at an originating host address and port number, the virtual object corresponding to the object.

6. A method of moving objects in a computer network, comprising:

receiving a move indication at an object to move to a new host address and port number of the computer network from a current host address and port number of the computer network;

determining whether the object is available for a move;

creating a serialized version of the object in response to the object's availability to move, the serialized version being a message that includes the object as a parameter;

retaining an old version of the object at the current host address and port number position;

sending the message representing the serialized version of the object to the new host address and port number;

creating a new version of the object at the new host address and port number from the serialized version of the object;

waiting for the object to become available for the move;

locking the object to prevent non-move operations to be performed on the object during the move.

7. A method of moving objects in a computer network, comprising:

receiving a move indication at an object to move to a new host address and port number of the computer network from a current host address and port number of the computer network;

determining whether the object is available for a move;

creating a serialized version of the object in response to the object's availability to move, the serialized version being a message that includes the object as a parameter;

retaining an old version of the object at the current host address and port number position;

sending the message representing the serialized version of the object to the new host address and port number;

creating a new version of the object at the new host address and port number from the serialized version of the object;

queuing messages to the object during the move.

8. The method of claim 7, further comprising:

forwarding the messages received during the move to the new version of the object, the old version of the object acting as a forwarder object for queued messages.

* * * * *